United States Patent [19]

Conner, Jr. et al.

[11] Patent Number: 5,263,167
[45] Date of Patent: Nov. 16, 1993

[54] USER INTERFACE FOR A RELATIONAL DATABASE USING A TASK OBJECT FOR DEFINING SEARCH QUERIES IN RESPONSE TO A PROFILE OBJECT WHICH DESCRIBES USER PROFICIENCY

[75] Inventors: Hampton K. Conner, Jr., Georgetown; Donald G. Petersen, Austin; John S. Wang, Austin; Richard B. Wood, Austin, all of Tex.

[73] Assignee: International Business Machines Corporation, Armonk, N.Y.

[21] Appl. No.: 796,144

[22] Filed: Nov. 22, 1991

[51] Int. Cl.$^5$ .............................................. G06F 9/00
[52] U.S. Cl. ................................ 395/700; 395/600; 395/155; 395/161; 364/DIG. 1; 364/282.1; 364/283.3
[58] Field of Search ............... 395/155, 161, 600, 158, 395/157, 700

[56] References Cited

U.S. PATENT DOCUMENTS

| | | | |
|---|---|---|---|
| 4,739,477 | 4/1988 | Barker et al. | 364/300 |
| 4,815,030 | 3/1989 | Cross et al. | 395/600 |
| 4,930,071 | 5/1990 | Tou et al. | 364/300 |
| 4,964,077 | 10/1990 | Elsen et al. | 395/275 |
| 5,119,475 | 6/1992 | Smith et al. | 395/156 |

OTHER PUBLICATIONS

A Relational Objecty Architecture (ROBA) for Managing User Interface Objects Rumi Hiraga, Yeong-Chang Lien, Apr. 1, 1990.
Systems Application Architecture, Common User Access: Advanced Interface Design, Guide, International Business Machines Corp., First Edition (Jun., 1989).
User Centered System Design, New Perspectives on Human-Computer Interaction, Donald A. Norman, Stephen W. Draper, 1986.
Rooms: The Use of Multiple Virtual Workspaces to Reduce Space Contention in a Window-Based Graphical User Interface, D. Austin Henderson, Jr., and Stuart K. Card, vol. 5, No. 3, Jul. 1986, pp. 211-243.
IBM Operating System/2 Extended Edition Version 1.3, Getting Started, Dec. 1990.

*Primary Examiner*—Thomas C. Lee
*Assistant Examiner*—Burch Harper
*Attorney, Agent, or Firm*—Casimer K. Salys

[57] ABSTRACT

A method and object-oriented architecture for interfacing a user to a relational database system The contour of the interface is defined by a profile object and a task object. The profile object, in response to user selection, defines one of multiple role objects with associated user proficiency and system behavioral characteristics. The task object responds to parameters derived from the profile object to generating a query for the relational database system. In one form, the task object includes one or more functional objects suitable to query the database. Representative functional objects are the domain object (used to formulate problem oriented queries), the analysis object (used to analyze the data extracted from the database), the report object (used to generate a user response format), and the link object (used to relate the components within the task object). The interface according to the invention matches the abilities of the user to the resources of the database system, manipulates problem oriented high-level queries, and provides an object oriented architecture readily amenable to object refinement.

5 Claims, 5 Drawing Sheets

USER INTERFACE FOR A RELATIONAL DATABASE USING A TASK OBJECT FOR DEFINING SEARCH QUERIES IN RESPONSE TO A PROFILE OBJECT WHICH DESCRIBES USER PROFICIENCY

BACKGROUND OF THE INVENTION

The present invention relates to a user interface for a relational database. More particularly, the invention is directed to an architecture and method for creating an object-oriented and user friendly interface through which a user of moderate skill in database technology can selectively extract information from a proximate or remote relational database.

The evolution of database technology both in hardware and software capability has provided users with significant memory and computational resources. Unfortunately, such resources exceed the training and experience possessed by prevailing users. As a consequence, database system designers have attempted to develop user interfaces which reduce the relative level of skill required to select information from relational databases. The classical query language for relational databases is the Structured Query Language (SQL). A contemporary and representative commercially available user interface is the Database Manager and the Query Manager code which is integrated into the OS/2 Extended Edition operating system, commercially distributed by IBM Corporation. However, as the prevalence of relational database use expands, and the level of training for a routine user decreases, the user friendly character of the human interface becomes a more important and significant contributor to the overall value of the database.

Though available and proposed user interface products include intuitive modes of operation which ease the training of novice users, such as mouse related pointing devices, icons, windows, pull-down or pop-up menus and alike, there remains a need for simplifying the interface at a higher level of architecture. Reducing the complexity of the interface at the video level of information conveyance, through such intuition based mechanisms, does not provide any user-related intelligence to the interaction by which the user defines a query and an output format for the relational database information.

Software technology is now entering into an era often referred to as object-oriented programming. In general, this form of programming provides units of code which co-mingle instructions and data, and when properly created facilitate reuse of the objects so defined. Unfortunately, most existing interfaces to relational databases are not of object oriented derivative, consequently, not amenable to evolution and migration either at the code or architectural level. The deficiencies are particularly acute at the architectural level, in that the structures of such conventional programs are not composed of transportable objects, but rather, are defined by strictly interrelated levels descending in direct hierarchy to the code lines.

Thus there exists a need for an interface between a human user and relational database having an architecture which is both object-oriented and intelligent at a high level of user interaction.

Summary Of The Invention

The present invention solves the aforementioned deficiencies in the prior art by providing an architecture which is both object oriented and intelligently interactive at selectable levels of user experience. In one form, the architecture defines a profile object and a task object. The profile object contours the interaction with the database from the perspective of the user, through the selection of role objects particularized to the idiosyncrasies of the user and relational database system resources The task object is itself architected from a multiplicity of functionally particularized objects. For example, in one form the task object contemplates the presence of a report object (suitable to provide, a response to the user), an analysis object (suitable to manipulate information extracted from the relational database), a query object (suitable to extract data from a relational database), a domain object, (suitable to customize compound queries to the relational database), and, lastly, a link object (suitable to relate the various functional objects within the task object).

The actual search of the relational database, according to the present architecture, is responsive to queries defined in the task object. The queries can originate solely in one of the functional objects of the task object, or, if desired by the user, can involve a multiplicity of queries generated in one or more of the functional units which make up the task object.

The architecture further defines that the activities of the task object are responsive to the profile object. As a consequence, the contour of the user as reflected by role is superimposed upon the task object. The profile object ensures appropriate interaction with the user, and, where necessary, assists the user in a methodical extraction of information from the relational database These and other features of the invention will be better understood and appreciated upon considering the detailed description which follows.

DESCRIPTION OF THE PREFERRED EMBODIMENT

Figure 1:
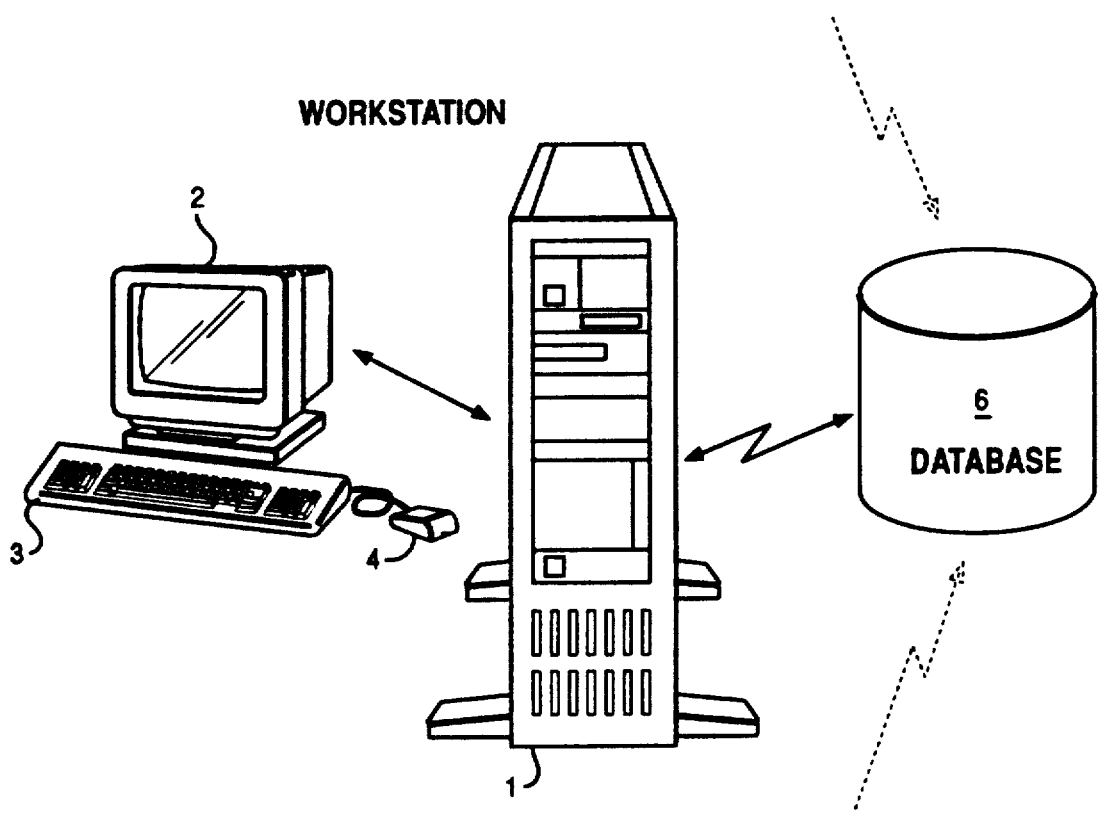
FIG. 1 is a schematic diagram of a workstation communicating with shared database

The invention as contemplated is preferably practiced in the context of a workstation such as illustrated in FIG. 1. The workstation includes cabinet 1, conventionally containing the processors, memory and communication adapters, video display 2, keyboard 3, mouse 4, and a means for communicating with database 6. Given that it is common for cabinet 1 to include both volatile memory and nonvolatile memory in the form of magnetic or optical disk storage, database 6 may be located proximate the workstation, such as by its presence in cabinet 1 memory, or may be situated at a remote location. As is common practice, database 6 is presumed to be available to other workstations through one or more networks. A preferred implementation of the workstation involves the use of PS/2 personal computer hardware and OS/2 personal computer operating system software, or RISC/6000 workstation hardware and AIX operating system software. Such hardware and software is readily available on the commercial market from IBM Corporation. Both operating systems provide resources for communicating with both a proximate database, such as would reside within cabinet 1, or remote database accessible through communications or network adapters of conventional design.

Figure 2:
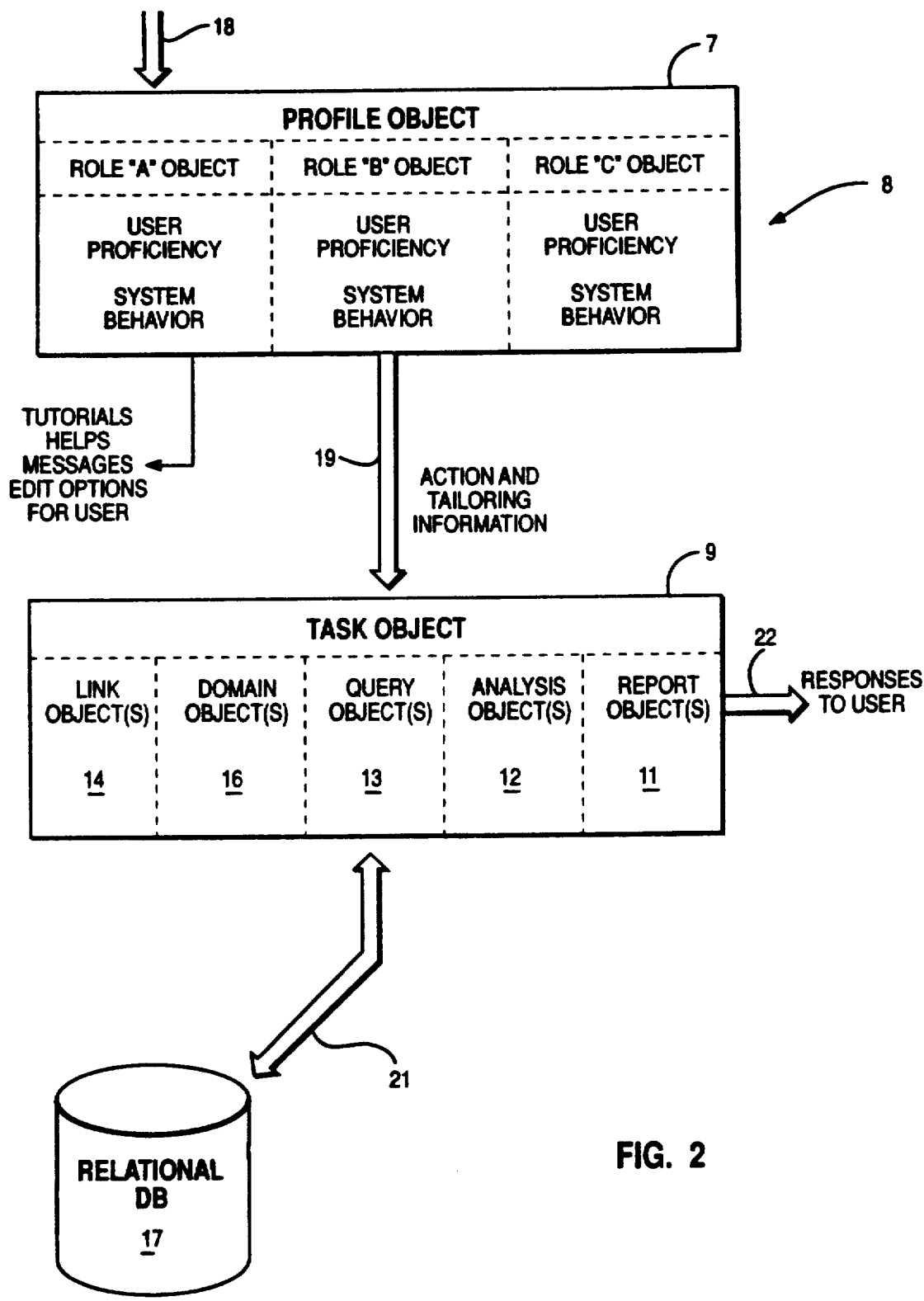
FIG. 2 is a schematic block diagram functionally illustrating the architecture for relating a user to a database.

The architecture and related practice according to the present invention are depicted by schematic block diagramming in FIG. 2. The functional concepts are grouped by objects At the highest level the architecture is composed of two objects and the various relationships which define interactions between the user, the objects, and the relational database.

Profile object 7 in FIG. 2 is composed of multiple sub-objects, namely, role objects, illustrated by the example set of three role objects A, B and C. In general, the profile object contours the interface to match the characteristics of the user with the system resources. In this regard, the profile object determines factors such as user expertise or proficiency, and thus will also define the levels of any tutorial assistance or help formats relating to the user. The goal of the profile object is to define parameters which match the user, the job which the user wishes to perform, and the system behavioral resources, so as to minimize the clutter on video display screen 2 (FIG. 1) by focusing user interactions with relevant information. According to the profile object defined in this architecture, the user acts in diverse roles depending on the objective of the database query and the user's proficiency in relation to such roles. The system behavior may differ between roles by the same user, such as would occur if for one role database 6 information was resident in cabinet 1 (FIG. 1) while for another role database 6 information was resident on a remote database. Clearly distinct role situations would occur as the user differed in job responsibility, for example, from a data entry clerk, to a highly trained professional performing data analysis, to a database administrator, or even to a task developer. Each user differs not only by the task he or she wishes to perform, but also as to user proficiency and system resources for the job that is to be accomplished. Therefore, one individual could assume several different roles during the course of any workday.

A preferred implementation of profile object 7 involves the creation of a multiplicity of role objects 8 within a profile object window on video display 2, and the display by icon or other means of the multiple role objects selectable. Upon selection by mouse actuated pointer, each role object defines a related role window from which the user selects characteristics such as proficiency (i.e., novice, fluent, literate and expert), system resources, and system behavior. The selective variation of interaction characteristic such as tutorials, helps, messages and editing options is also contemplated. Thereby, profile object 7, by way of multiple role objects 8, describes and organizes user traits and system characteristics which uniquely define and match the user, the job and the database system.

The other end of the spectrum defined by the architecture is represented by a task object 9. In general, the task object is a structured collection of functional sub-objects. The individual objects within task object 9 are expressions of the work to be performed in response to a profile object. The various objects within task object 9 are used to automate the steps required to complete the job, typically the selective acquisition of the information from the memory, the analysis of the acquired data, and generation of a report using the data For example, task object 9 in FIG. 2 includes report object 11, an object suitable to generate reports of prescribed format from data selected by the task object Also present within task object 9 is analysis object 12, which object performs, as suggested by its name, an analysis of the data (which may involve computations) derived from the database. Query object 13 represents a typical query program such as SQL, providing the resources within task object 9 to complete conventional relational database queries. Link object 14 relates the various objects within task object 9 so as to perform the composite objective defined by the user. The links may be static, in the form of data flow between objects, dynamic, such as outcome responsive communication, or may merely generate referential pointers within task object 9. In a representative practice, the link object describes the order that the other objects within the task object are performed.

The last of the illustrated component objects within task object 9 is domain object 16. Within the present architecture, domain object 16 organizes and arranges information to customize the actual access of the data within the relational database The domain object isolates, or hides, the details of the relational database access from the user. Thereby, specification of system parameters, such as where relational database 17 physically resides, and protocols suitable to communicate with the database, are obviated as user concerns The domain object contains the translation which converts a user question into a reading of a particular database and table location. The functional objective of the domain object is to eliminate or substantially decrease the need for the user to translate between a problem oriented definition of the data sought from the database and the SQL format equivalent. Thus, the domain object is analogous to a data structure within a high level programming language of the type commonly used to define program functions.

As an example of how domain object 16 is used to perform a representative relational database query, consider the domain object Quarterly_Sales referenced to a database containing sales tables., Quarterly_Sales is defined as a domain object which accepts two parameters, the first being the quarter and the second being the year. The sales data is assumed to be stored in a table listing individual years by row and months of the year by column. The domain object Quarterly_Sales in a task for a query specification prescribes the combined operation of reading data from the relational database for the appropriate three months of the specified year, summing the values so access, and providing the results to the user as a single response representing Quarterly_Sales.

The various sub-tasks which comprise task object 9 in FIG. 2 are analogous to the individual elements of work which must be performed to provide the relational database derived information to the user in a cohesive and complete form. Query object 13 and domain object 16 serve to interface task object 9 with relational database 17 to insure that respective conventional queries and problem oriented query definitions extract appropriate data from relational database 17. Analysis object 12 then manipulates the results of one or more queries. If so defined by the user, the analysis object can include resources to further enable multiple queries of systemic relationship. Cohesiveness within task object 9 is provided by link object 14. Link object 14 defines the relationships between the various objects within task object 9 to ensure the interaction of the functions and data satisfies the objectives of the user. The link object can be static in configuration, and as such merely define the flow of data among the objects of task object 9. Link object 14 can also be of dynamic character, whereby both data and control are communicated among the components of task object 9. In its simplest form, link object 14 merely serves as a reference holder, providing pointers for communication of information between the components of task object 9. Last among the illustrated components within task object 9 is report object 11. The purpose of report object 11 is to define the format of the response to the user. For example, the response to the user can be in text format, or in a variety of differing graphical representations, whether on video display screen 2 (FIG. 1) or in hard copy form.

What makes the architecture in FIG. 2 particularly useful and valuable is that it succeeds in three respects. First, the architecture provides a user interface which matches the user's abilities for the specific task undertaken and in the context of the system within which the user is acting. Secondly, the architecture provides a cohesive and automated methodology for accomplishing tasks in a problem oriented definition, in contrast to conventional practices which require the user to define each element of the database interaction step by step. And thirdly, the architecture is modular, so that the methods and data which define each object provide interfaces which are consistent without regard to changes within the object.

Consider one example of the architecture in operation to appreciate the implications. Assume a first user defines within profile object 7 that he or she intends to perform according to role "A". In doing so, the user also specifies a proficiency level in that role and a system resource behavior relating to that role. The parameters are transformed to action and tailoring information, and then conveyed to task object 9. Within task object 9, such information is used to select a specific domain object, a report object and a related link object. Following actual query of relational database 17, an appropriate response is provided to the user.

If, on the other hand, the same user chooses to undertake "B", a different set of action and tailoring information is likely defined and conveyed to task object 9. The relation definition of different component objects and links therebetween follows. Note that the architecture recognizes that the same user can have a significantly different proficiency levels between role "A" and role "B". The selection of the task object for role "B" likely differs, and therefore requires a distinct domain object defined query to relational database 17, and an appropriate report object defined response to the user.

Continuing in the context of the example, if at a later time the user becomes more proficient, or choice to redefine the response sought, only the affected objects require refinement or substitution. Thus, the architecture is object oriented. Similarly, if a second user seeks the same database information while acting in the same role as the first user, the existing profile and task objects remain viable.

As depicted in FIG. 2, the architecture contemplates the entry of user selections or defaults 18 into profile object 7. Based upon the role define by the user selections, the tutorials, helps, messages and edit objects are defined. Furthermore, action and tailoring information 19 conveyed to task object 9 enables appropriate electronic communication 21 of the query to relational database 17. Response to the user 22 is normally by way of text or graphics on a video display, but does not exclude results conveyed by printed or audio modes of communication.

Figure 3:
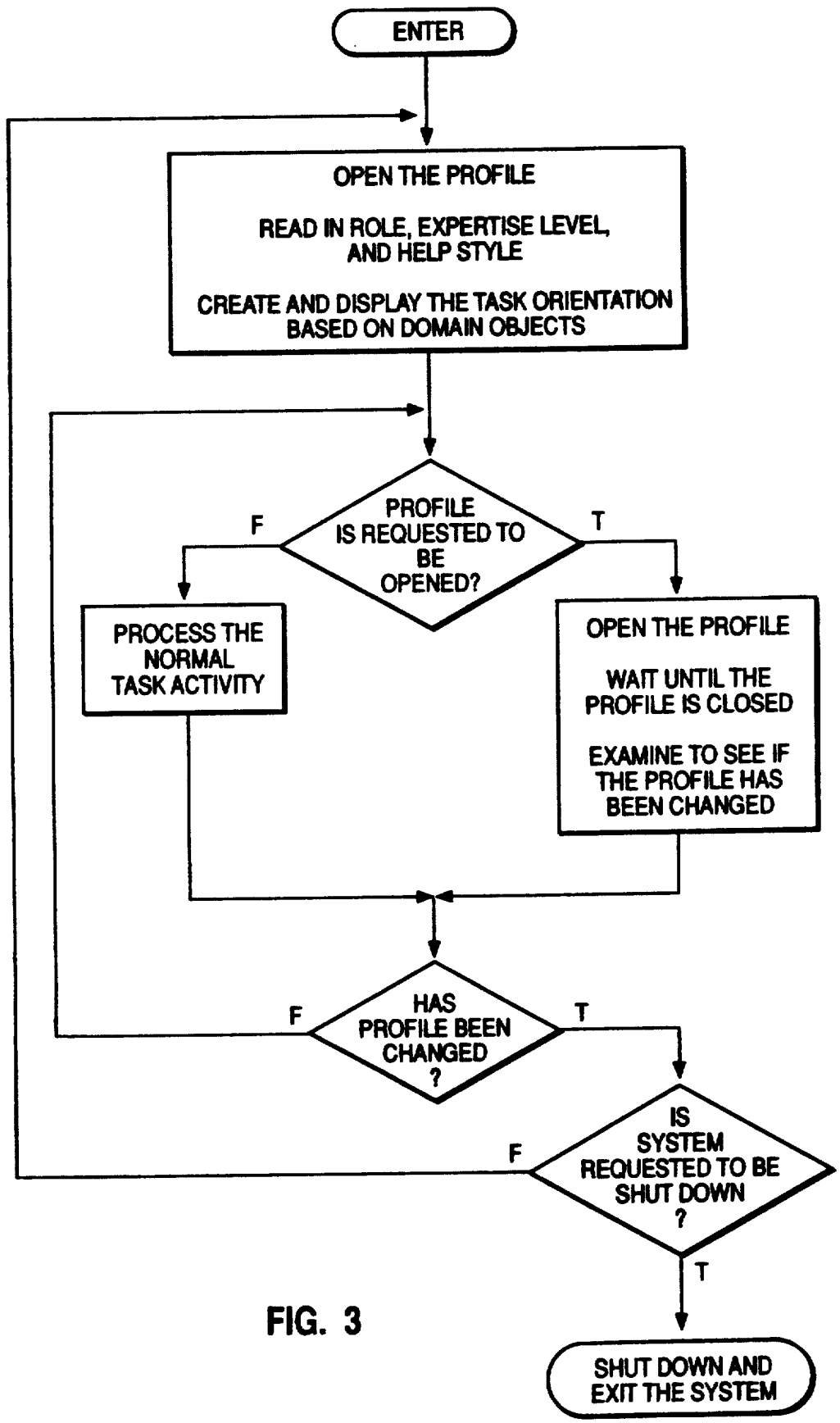
FIG. 3 is a flow diagram schematically illustrating a method according to the architecture in FIG. 2.

FIG. 3 depicts by flow diagram one method of using the architecture to interface a user with a relational database. Since the operations, decisions and paths are clearly depicted, and consistent with the architecture illustrated in FIG. 2, individualized developed of the elements in FIG. 3 is superfluous. What is worth noting from the flow diagram is the prevalence of the profile in defining the interaction.

Figure 4:
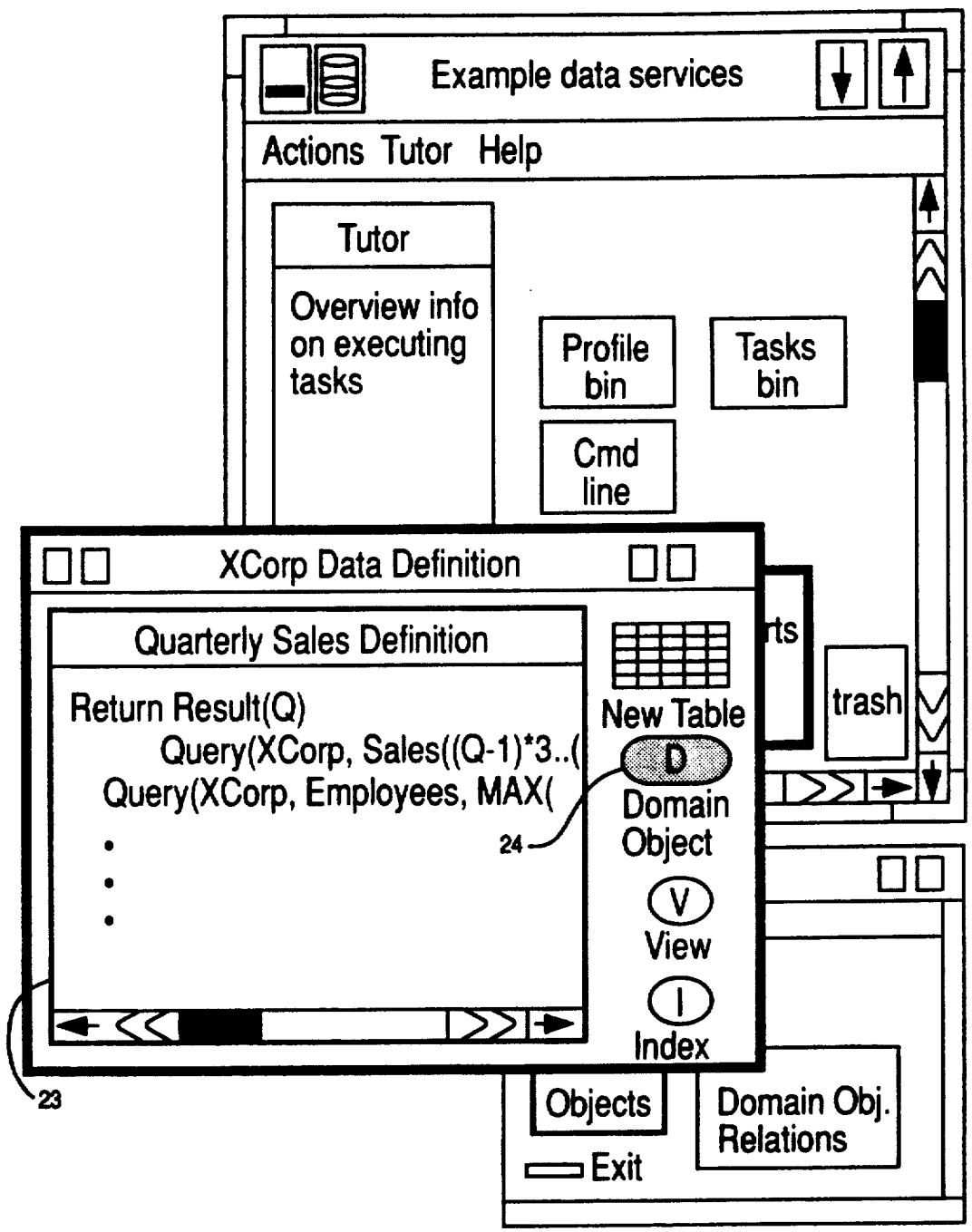
FIG. 4 and 5 are a schematic diagrams illustrating representative video display windows generated according to one practice of the present invention.

One example which visually illustrates a practice of the architecture appears in FIG. 4. In FIG. 4, the user is creating a domain object identified as Quarterly_Sales within window 23. The shading of ellipse 24, identified as the domain object icon, establishes that it is the subject of the user's action. This icon as well as the others depicted in FIG. 4 are selectable by conventional means in the context of the workstation depicted in FIG. 1.

Figure 5:
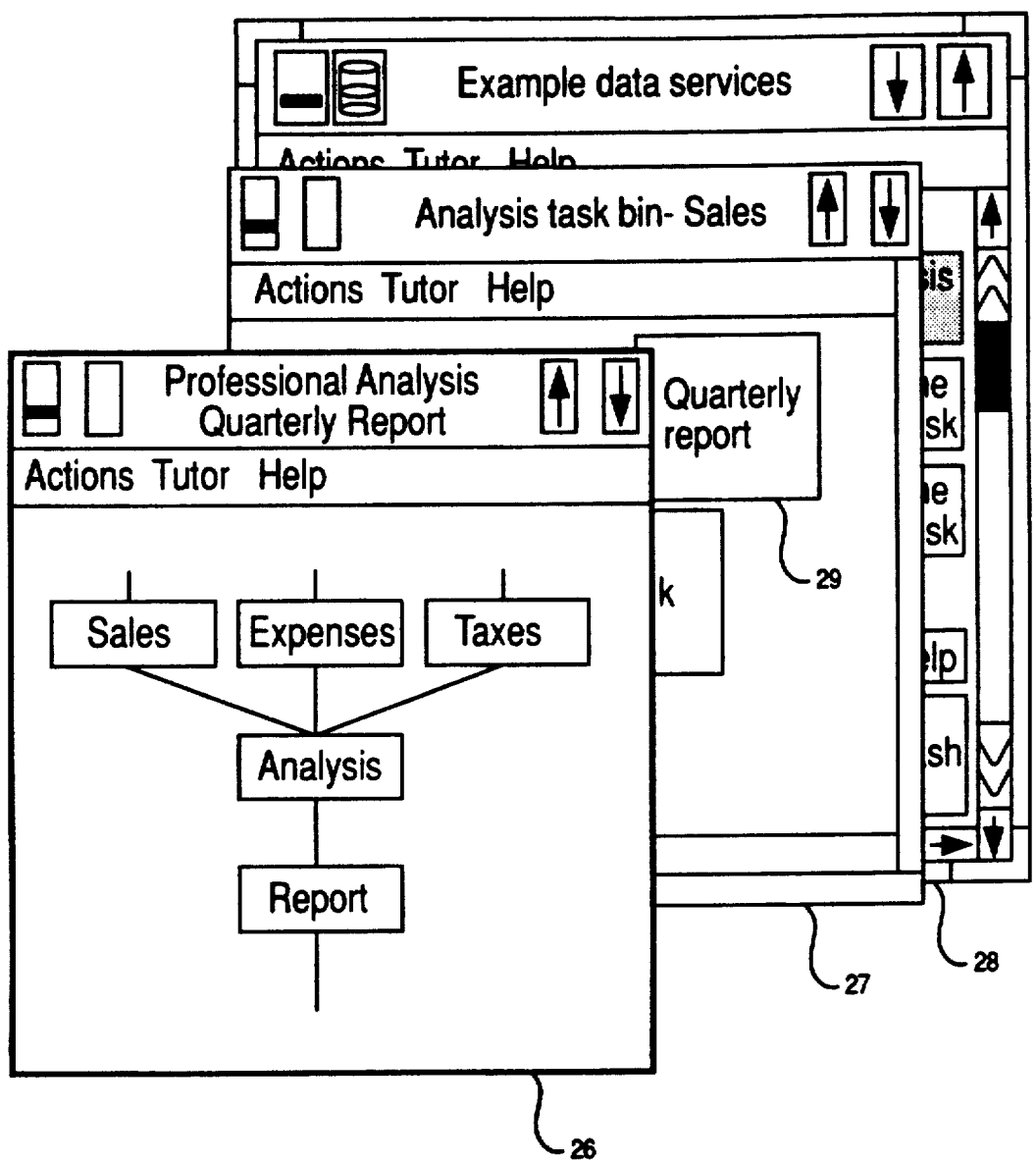

The FIG. 5 depicts a set of three windows, 26-28, which illustrate by example the definition of a link to create a user response in the form of a quarterly report. Note the presence in window 26 of three query objects (sales, expenses and taxes) providing data into the analysis object, and further into the report object for the task being defined. The quarterly report is identified by icon 29 within task object window 27.

From the foregoing, one should now be able to appreciate that the method and architecture according to the present invention facilitates a contouring of the interface between a user and a relational database, that it provides a broad choice of query analysis resources, and that it is amenable to refinement and expansion. The user acts through a profile object and a task object to acquire relational database information. The profile object matches the system resources to the user, while the task object defines the work sought by the user in the context of the profile object.

Though the invention has been described and illustrated by way of a specific embodiment, the architecture and method encompassed by the invention should be interpreted consistent with the breath of claim set forth hereinafter.

We claim:
1. An object oriented user interface for a relational database system, comprising:
   a profile object having role objects, including user proficiency and system behavioral characteristics, which define roles for a user;
   a task object, including a domain object for interfacing a problem oriented user query to the relational database system, which defines a data base search query in response to a role object from the profile object; and means for searching the relational data base system according to the query defined in the task object.
2. The interface recited in claim 1, further including means for a user to select a role object from the role objects of the profile object.
3. The interface recited in claim 2, wherein the task object further includes a link object, an analysis object and a report object.
4. A method for interfacing a user to a relational data base system, comprising the steps of:

creating a profile object having role objects, including user proficiency and system behavioral characteristics, which define roles for the user;

creating a task object, including a domain object for interfacing a problem oriented user query to the relational data base system, which defines a data base search query in response to a role object from the profile object; and searching the relational data base system according to the query defined in the task object.

5. The method recited in claim 4, further including the step of selecting a role object from the role objects of the profile object.

* * * * *